United States Patent
Clingerman et al.

(10) Patent No.: US 6,893,756 B2
(45) Date of Patent: May 17, 2005

(54) LAMBDA SENSING WITH A FUEL CELL STACK

(75) Inventors: Bruce J. Clingerman, Palmyra, NY (US); Jeffrey A. Rock, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 223 days.

(21) Appl. No.: 10/136,862

(22) Filed: Apr. 30, 2002

(65) Prior Publication Data

US 2003/0203253 A1 Oct. 30, 2003

(51) Int. Cl.$^7$ ................................................ H01M 8/04
(52) U.S. Cl. ........................ 429/22; 429/23; 429/13; 429/12
(58) Field of Search ................... 429/22, 23, 13, 429/12

(56) References Cited

U.S. PATENT DOCUMENTS

| | | |
|---|---|---|
| 4,886,590 A | 12/1989 | Tittle |
| 5,085,949 A | 2/1992 | Sanderson et al. |
| 5,170,124 A | 12/1992 | Blair et al. |
| 5,763,113 A | 6/1998 | Meltser et al. |
| 5,915,499 A | 6/1999 | Few |
| 5,945,229 A | 8/1999 | Meltser |
| 6,406,806 B1 * | 6/2002 | Keskula et al. .............. 429/13 |
| 6,528,192 B2 * | 3/2003 | Lacy et al. ................... 429/13 |
| 2002/0051899 A1 | 5/2002 | Keskula et al. |

FOREIGN PATENT DOCUMENTS

| | | |
|---|---|---|
| DE | 19523260 | 3/1997 |
| DE | 0918363 | 5/1999 |
| JP | 4174975 | 6/1992 |
| JP | 6140066 | 5/1994 |
| JP | 09022716 | 1/1997 |
| JP | 9092317 | 4/1997 |
| JP | 11154520 | 6/1999 |
| WO | WO91/19328 | 12/1991 |

OTHER PUBLICATIONS

Notification of Transmittal Of The International Search Report Or The Declaration, dated Sep. 2, 2003.

\* cited by examiner

*Primary Examiner*—Carol Chaney
*Assistant Examiner*—Angela J. Martin
(74) *Attorney, Agent, or Firm*—Cary W. Brooks; Linda M. Deschere

(57) ABSTRACT

A sensor for monitoring the lambda of a component of a reactant feed stream flowing through a fuel cell stack. The sensor comprises one or more fuel cells that are sensitive to a change in lambda of a specific component of a reactant feed stream flowing through the fuel cell. The sensitivity of the fuel cell causes a voltage produced by the lambda sensing fuel cell to vary in response to variation in the lambda of the specific component. The variation of the voltage output can be modeled and/or compared to empirical data to correlate the voltage output to the lambda of the specific component. Based on the lambda of the specific component, the operation of the fuel cell stack can be optimized.

39 Claims, 4 Drawing Sheets

LAMBDA SENSING WITH A FUEL CELL STACK

FIELD OF THE INVENTION

The present invention relates to the measuring and controlling of components in reactant feed streams flowing through a fuel cell system. More specifically, the present invention relates to measuring the lambda of components in reactant feed streams to determine the performance and efficiency of the fuel cell system and for modifying the reactant feed streams to optimize the performance of the fuel cell system.

BACKGROUND OF THE INVENTION

Fuel cells can be used as a power source in many applications. For example, fuel cells have been proposed for use in electrical vehicular power plants to replace internal combustion engines and as stationary power sources to name a few. The fuel cells receive reactant feed streams and convert the energy in the feed streams into electricity. The reactant feed steams include a fuel feed stream which is passed over an anode in the fuel cell and an oxidant feed stream which is passed over a cathode in the fuel cell to generate electricity.

One type of fuel cell is a proton exchange membrane (PEM) type fuel cell. In a PEM fuel cell hydrogen, in the form of pure $H_2$ from a storage tank or in the form of a reformate flow from a fuel processor, is supplied as the fuel to the anode of the fuel cell and oxygen, in form of pure $O_2$ from a storage tank or in the form of air ($O_2$ admixed with nitrogen ($N_2$)) from the ambient or a storage tank, is supplied as the oxidant to the cathode of the fuel cell. A plurality of individual cells are bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily $H_2$ and $CO_2$, however, CO, $N_2$, and $H_2O$ can also be in the reformate gas.

The fuel cell system operates in terms of excess fuel and oxidant feed stream flow rates wherein the energy supplied is greater then the amount of energy required. For example, the anode portion of an individual fuel cell may require approximately 130% of the required energy to generate a given load while the cathode portion may require approximately 200% of the required $O_2$ to complete the reaction of the fuel flow. The excess oxidant and fuel feed stream flows are measured in terms of lambda '$\lambda$' whereby the amount of excess $H_2$ required is termed $\lambda_A$ and the amount of excess $O_2$ required is termed $\lambda_C$. In the previous example, the excess fuel feed stream $\lambda_A$ would be 1.3 and the excess oxidant feed stream $\lambda_C$ would be 2.0. This means that 1.0 part hydrogen is converted to electrical energy for every 1.3 parts provided to the anode with the remaining 0.3 part hydrogen exiting the fuel cell stack as anode effluent.

Each PEM fuel cell within a fuel cell stack requires a specific $\lambda_C$ and $\lambda_A$ to maximize the efficiency of the fuel cell. The specific $\lambda_C$ and $\lambda_A$ may vary between similar fuel cells. A fuel cell stack having a plurality of fuel cells will have an average $\lambda_C$ and $\lambda_A$ for the entire stack as a result of the variance between individual fuel cells in the stack. Once the average $\lambda_C$ and $\lambda_A$ are determined for the fuel cell stack, a sensor is needed to monitor the fuel and oxidant feed stream flows through the fuel cell stack so that the operation of the fuel cell stack can be optimized and so that real-time changes can be made to the reactant feed streams to maintain the efficient operation of the stack.

Therefore, efficient operation of a fuel cell system depends on the ability to effectively control the amount of $O_2$ and $H_2$ provided to the fuel cell stack. Mass flow meters can be used to measure the amount reactant feed streams being provided to the fuel cell stack. However, the mass flow meters cannot measure the specific components of the feed streams. Therefore, if the composition of the feed streams changes, the mass flow meter will not be able to provide a quantitative measure of the amount of $O_2$ and $H_2$ provided to the fuel cell stack. The use of mass flow meters is particularly difficult during transient operation of a vehicular fuel cell system wherein the reformate fuel requirements vary with the changing loads placed on the fuel cell and when the composition of the reformate fuel leaving a fuel processor is also changing.

Thus there is a need for an accurate lambda sensing system which maintains an efficiency of the fuel cell stack but does not add complexity or weight to the fuel cell system. Additionally, there is a need for a lambda sensing system which also corrects inefficient $\lambda_A$ and $\lambda_C$ values on a real-time basis without the intervention of the user.

SUMMARY OF THE INVENTION

The present invention is directed towards a method and apparatus for real-time monitoring and controlling of a fuel feed stream flow and an oxidant feed steam flow through a fuel cell system.

A fuel cell assembly according to the principles of the present invention has a fuel cell stack that receives first and second reactant flows. The reactant flows pass by anode and cathode surfaces and electricity is produced. The fuel cell stack is comprised of a plurality of fuel cells arranged in a stacked configuration with the fuel cells electrically in series. At least one of the fuel cells has a voltage output that changes in a known manner in response to changes in lambda of a component of the first reactant flow. A voltage monitoring device monitors the voltage output of the at least one fuel cell and sends a signal to a controller that corresponds to the monitored voltage. The controller controls the first reactant flow in response to the signal.

A method of monitoring changes in lambda of a component in a reactant feed stream flowing to a fuel cell stack comprised of a plurality of fuel cells arranged electrically in series is disclosed. The method includes the steps of: (1) supplying a first reactant feed stream to a fuel cell stack; (2) supplying a second reactant feed stream to said fuel cell stack; (3) selecting a first fuel cell in said fuel cell stack having a voltage output that varies in a known manner to a change in lambda of a component of said first reactant feed stream; (4) monitoring said voltage output of said first fuel cell; and (5) controlling said first reactant feed stream based on said voltage output of said first fuel cell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment is merely exemplary in nature and is in no way intended to limit the invention, its application, or uses.

Briefly, the present invention provides a sensor that monitors the lambda of a component of a reactant feed stream flowing through a fuel cell stack. The sensor comprises one or more fuel cells that are sensitive to a change in lambda of a specific component of a reactant feed stream flowing through the fuel cell. The sensitivity of the fuel cell causes a voltage produced by the lambda sensing fuel cell to vary in response to variations in the lambda of the specific component. The variation of the voltage output can be modeled and/or compared to empirical data to correlate the voltage output to the lambda of the specific component. Based on the lambda of the specific component, the operation of the fuel cell stack can be optimized by adjusting the reactant feed streams flowing to the fuel cell stack. Additionally, the lambda of the specific component can also be used to adjust, optimize, and/or predict the performance of other hardware components, such as a reformer or combustor, in a system within which the fuel cell stack is operating.

The invention may be further understood with reference to a generic fuel cell system. Therefore, before further describing the invention, a general overview of a system within which a fuel cell stack having a lambda sensing fuel cell of the present invention can be operated is provided.

In the fuel cell system, a hydrocarbon fuel is processed in a fuel processor, for example, by reformation and partial oxidation processes, to produce a reformate gas which has a relatively high hydrogen content on a volume or molar basis. Therefore, reference is made to hydrogen-containing or relatively high hydrogen content. The invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

Figure 1:
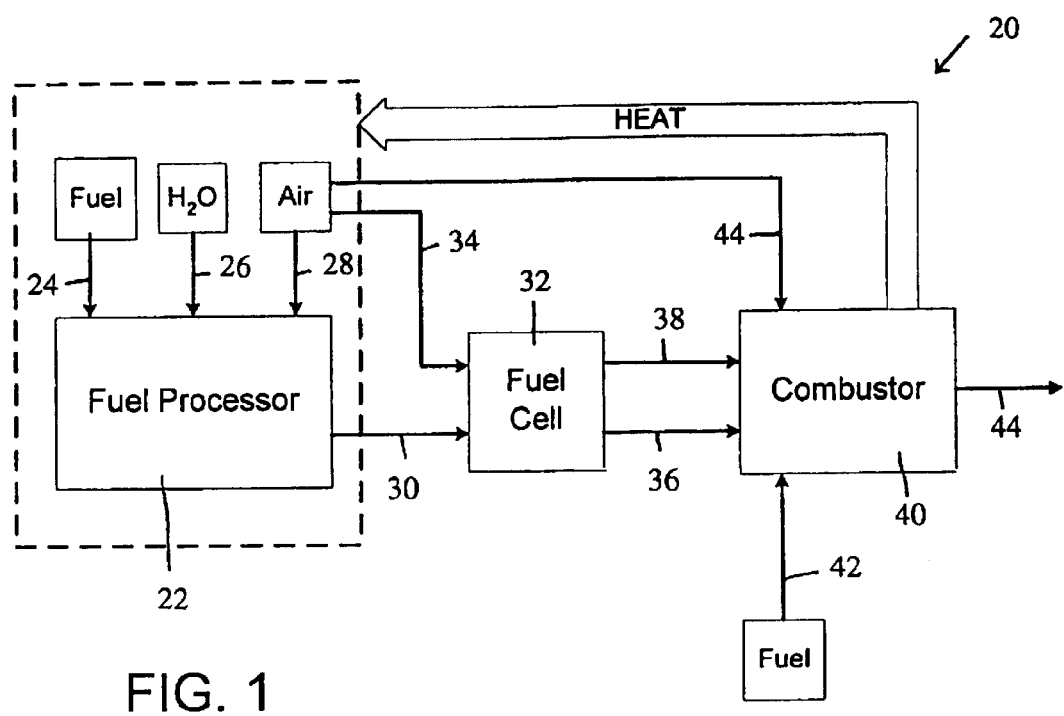
FIG. 1 is a schematic illustration of a fuel cell system.

As shown in FIG. 1, a fuel cell system 20 includes a fuel processor 22 for catalytically reacting a reformable hydrocarbon fuel stream 24, and water in the form of steam from a water stream 26. In some fuel processors, air is also used in a combination partial oxidation/steam reforming reaction. In this case, fuel processor 22 also receives an air stream 28. The fuel processor 22 contains one or more reactors wherein the reformable hydrocarbon fuel in stream 24 undergoes dissociation in the presence of steam in stream 26 and air in stream 28 to produce the hydrogen-containing reformate which is exhausted from the fuel processor 22 in reformate stream 30. The fuel processor 22 typically also includes one or more downstream reactors, such as a watergas shift (WGS) and/or preferential oxidizer (PROX) reactors which are used to reduce the level of carbon monoxide in the reformate stream 30 to acceptable levels, for example, below 20 ppm. The $H_2$-containing reformate 30 is fed through the anode chamber of a fuel cell stack 32. At the same time, oxygen in the form of an air in stream 34 is fed into the cathode chamber of the fuel cell stack 32. The hydrogen from the reformate stream 30 and the oxygen from the oxidant stream 34 react in the fuel cell stack 32 to produce electricity.

Anode exhaust or effluent 36 from the anode side of the fuel cell stack 32 contains some unreacted hydrogen. Cathode exhaust or effluent 38 from the cathode side of the fuel cell stack 32 may contain some unreacted oxygen. These unreacted gases represent additional energy which can be recovered in a combustor 40, in the form of thermal energy, for various heat requirements within the system 20.

Specifically, a hydrocarbon fuel 42 and/or anode effluent 36 can be combusted, catalytically or thermally, in the combustor 40 with oxygen provided to the combustor 40 either from air in stream 44 or from the cathode effluent stream 38, depending on system operating conditions. The combustor 40 discharges an exhaust stream 44 to the environment and the heat generated thereby may be directed to the fuel processor 22 as needed.

Figure 2:
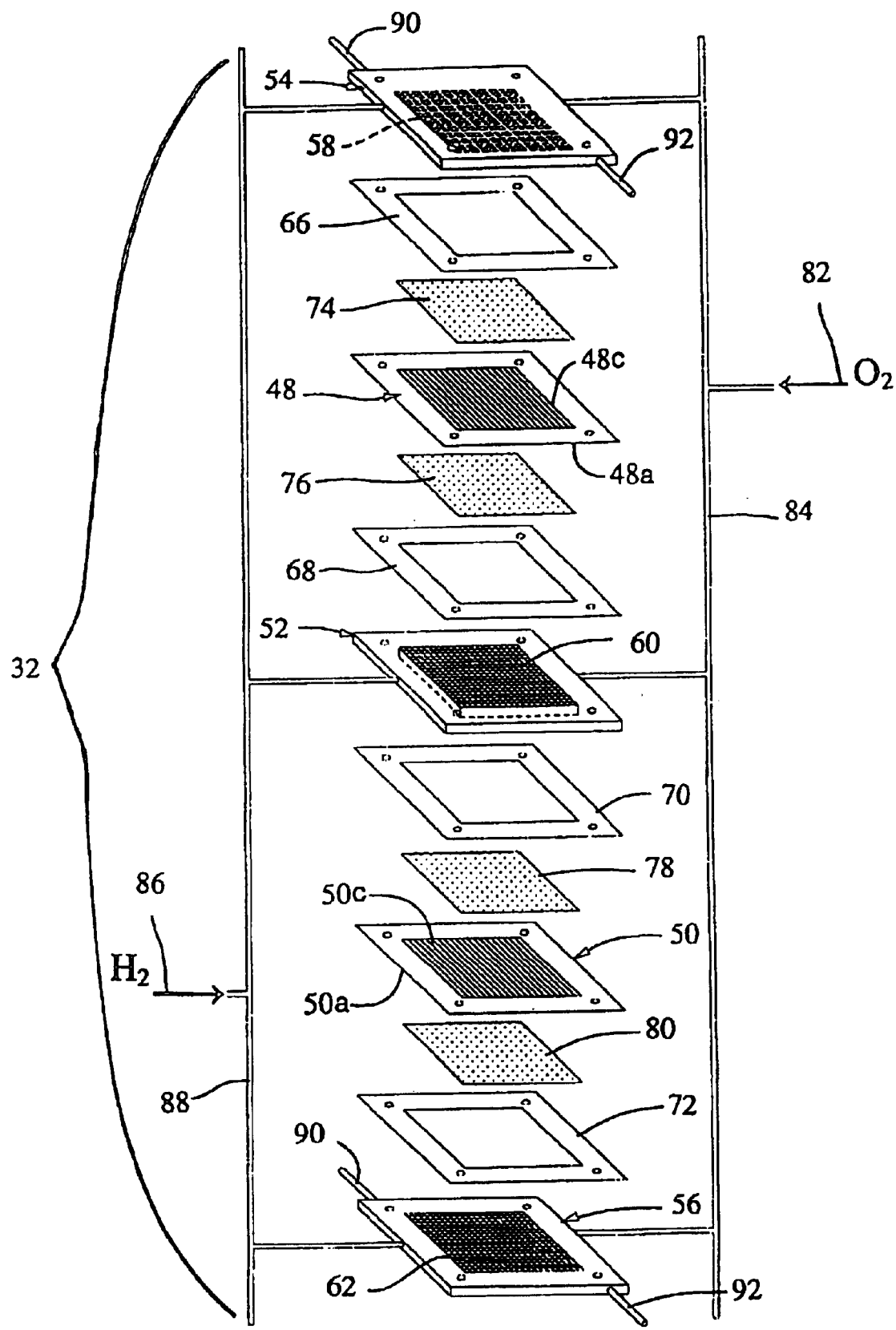
FIG. 2 is a schematic isometric exploded illustration of a PEM fuel cell stack.

Referring now to FIG. 2, a portion of a PEM fuel cell stack 32 is depicted. The PEM fuel cell stack 32 has a pair of membrane-electrode-assemblies (MEAs) 48 and 50 separated from each other by a non-porous, electrically-conductive bipolar plate 52. Each of the MEAs 48, 50 have a cathode face 48c, 50c and an anode face 48a, 50a. The MEAs 48 and 50, and bipolar plate 52, are stacked together between non-porous, electrically-conductive, liquid-cooled bipolar plates 54 and 56. The bipolar plates 52, 54 and 56 each include flow fields 58, 60 and 62 having a plurality of flow channels formed in the faces of the plates for distributing reactants, such as fuel and oxidant gases, in this case hydrogen ($H_2$) and oxygen ($O_2$), to the reactive faces of the MEAs 48 and 50. Nonconductive gaskets or seals 66, 68, 70, and 72 provide a seal and electrical insulation between the several plates of the fuel cell stack. Porous, gas-permeable, electrically-conductive sheets 74, 76, 78 and 80 press up against the electrode faces of the MEAs 48 and 50 and serve as primary current collectors for the electrodes. Primary current collectors 74, 76, 78 and 80 also provide mechanical supports for the MEAs 48 and 50, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass there through.

Bipolar plates 54 and 56 press up against the primary current collector 74 on the cathode face 48c of MEA 48 and primary current collector 80 on the anode face 50a of MEA 50, while the bipolar plate 52 presses up against the primary current collector 76 on the anode face 48a of MEA 48 and against the primary current collector 78 on the cathode face 50c of MEA 50. An oxidant gas such as oxygen or air is supplied to the cathode side of the fuel cell stack in oxidant feed stream 82 via appropriate supply plumbing 84. Similarly, a fuel, in the form of hydrogen, is supplied to the anode side of the fuel cell in fuel feed stream 86 via appropriate supply plumbing 88. The oxidant feed stream 82 can be provided from a variety of sources. For example, the oxidant feed stream 82 can come from a storage tank (not shown) or air from the ambient. Likewise, the fuel feed stream 86 can also be provided from a variety of sources. For example, the fuel feed stream 86 can come from a storage tank (not shown) or a fuel processor, such as the fuel processor 22 shown in FIG. 1. Exhaust plumbing (not shown) for both the fuel and oxidant sides of the MEAs is also provided for removing anode and cathode effluents from the respective anode and cathode flow fields. Coolant plumbing 90 and 92 is provided for supplying and exhausting liquid coolant to the bipolar plates 54 and 56, as needed.

Figure 3:
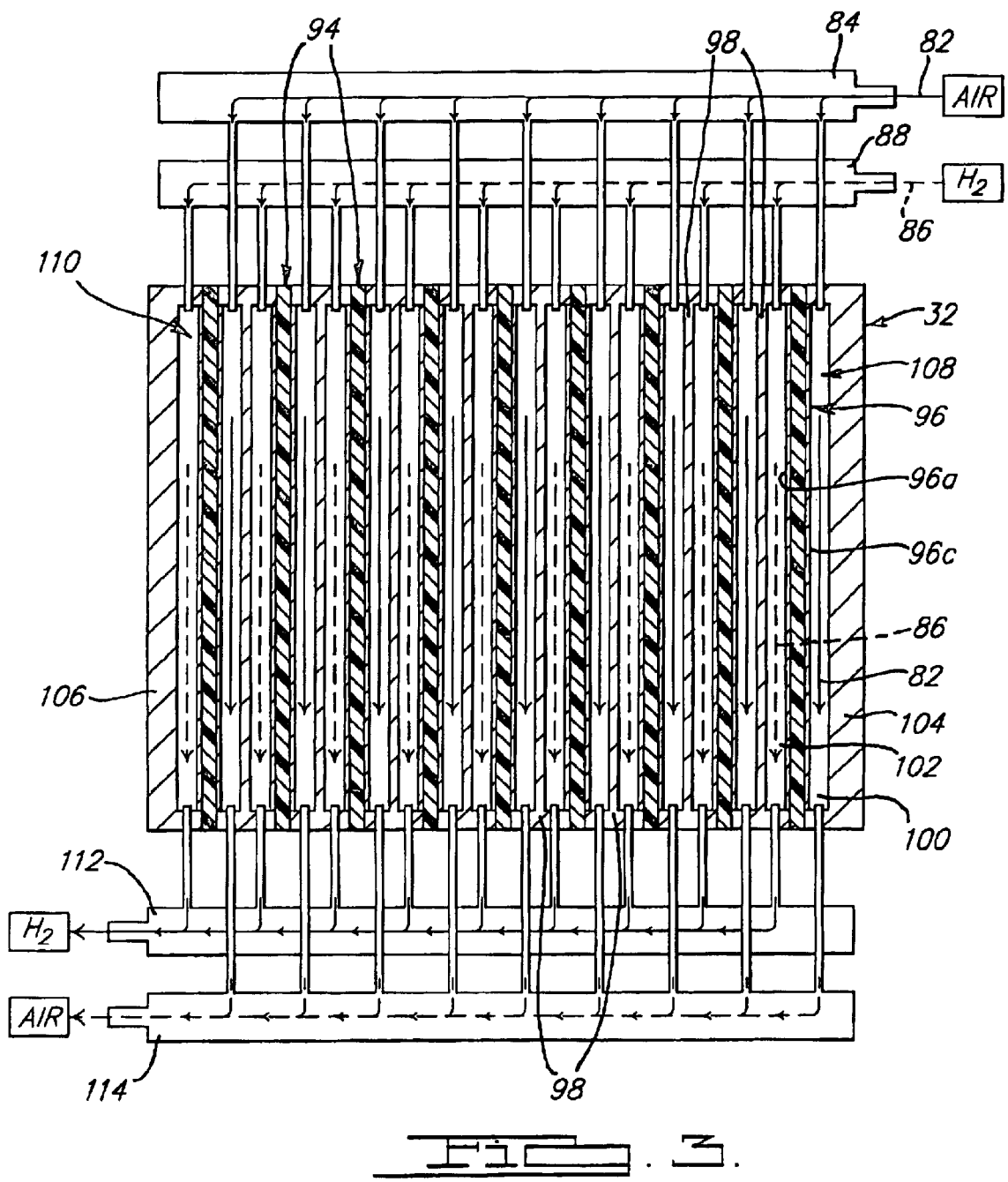
FIG. 3 is a schematic illustration of a bipolar, PEM fuel cell stack having a lambda sensor in accordance with the present invention.
Figure 4:
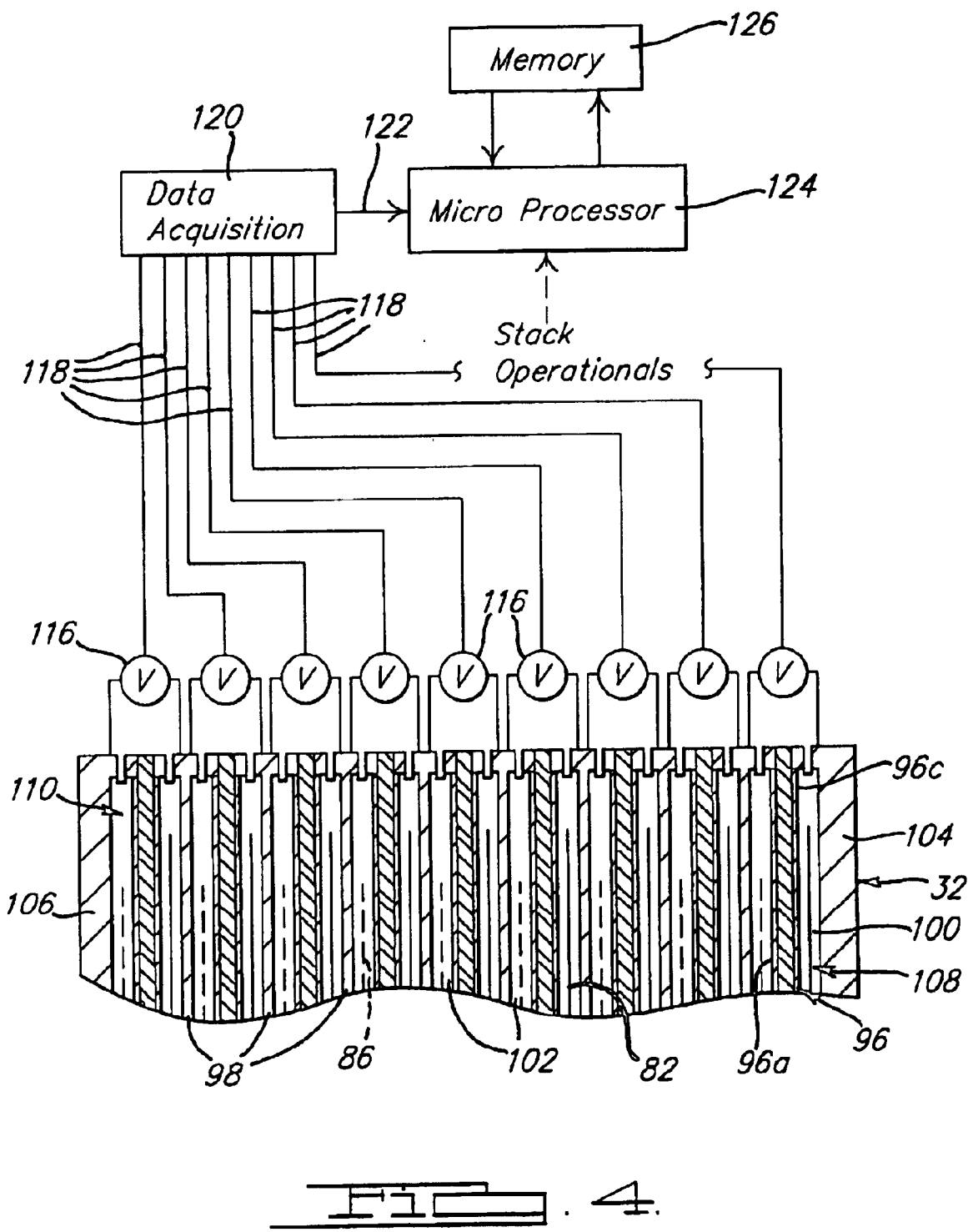
FIG. 4 is a schematic illustration of the fuel cell stack of FIG. 3 with the upper reactant feed stream plumbing removed to show the voltage monitoring of the fuel cells within the stack.

Referring now to FIGS. 3 and 4, a fuel cell stack 32 according to the principles of the present invention is depicted. The fuel cell stack 32 is comprised of individual fuel cells 94, like those shown in FIG. 2, each having an MEA 96 with an anode face 96a on one side and a cathode face 96c on an opposite side, like MEAs 48 and 50. Each fuel cell 94 is interposed between a pair of bipolar plates 98, which are similar to bipolar plates 52, 54, and 56. A cathode flow channel 100 is provided adjacent each of the cathodes 96c for flowing the oxidant feed stream 82 by, and into contact with, the cathode 96c. Similarly, an anode flow channel 102 is provided adjacent each of the anodes 96a for flowing the fuel feed stream 86 by, and into contact with, the anodes 96a. The membrane in MEA 96 will preferably comprise a perfluoronated sulfonic acid polymer such as NAFION®, as is well known in the PEM fuel cell art. Each individual fuel cell 94 is separated from the next cell 94 in the stack 32 by bipolar plate 98, which separates the several cells one from the next while conducting electrical current in electrical series directly from one cell to the next. End plates 104 and 106 terminate the stack 32 and define the respective cathode and anode flow channels for the end cells 108 and 110 of the stack 32. An oxidant-feed manifold 84 supplies oxidant feed stream 82 to the several cathode flow channels 96. Similarly, a fuel-feed manifold 88 supplies fuel feed stream 86 to the several anode flow channels 102. An anode effluent manifold 112 collects anode effluent (exhaust gas) from the several anode flow channels 102 for discharge from the stack 32. Similarly, a cathode effluent manifold 114 collects cathode effluent (exhaust gas) from the cathode flow channels 100.

The reactant feed streams 82 and 86 provide an oxidant and a fuel to the fuel cell stack 32 which generates electricity therefrom. The fuel cell stack 32, shown in the figures, uses hydrogen as the fuel and oxygen, either pure $O_2$ or air, as the oxidant. The hydrogen can be pure $H_2$ or in a reformate stream 30. The reformate stream 30 contains hydrogen along with other components, such as CO, $CO_2$, $N_2$, and $H_2O$. For efficient operation, the stack 32 is provided with excess oxidant and fuel wherein the energy supplied is greater then the amount of energy required. The excess oxidant and fuel are measured in terms of lambda 'λ' whereby the amount of excess $H_2$ required is termed lambda anode '$\lambda_A$' and the amount of excess $O_2$ required is termed lambda cathode '$\lambda_C$'. Lambda is defined as:

$$\lambda = \frac{\text{mol}\cdot\text{sec}^{-1} \text{ of } X \text{ delivered to stack}}{\text{mol}\cdot\text{sec}^{-1} \text{ of } X \text{ consumed by the stack}}$$

where X is a component in a feed stream flowing through the fuel cell stack 32.

Due to variations in the construction and manufacture of the fuel cells 94, each fuel cell 94 may have a different required $\lambda_A$ and $\lambda_C$ to operate efficiently. Such variations can be caused by a variety of reasons. For example, variations can be caused by manufacturing differences in catalyst loading, plate dimensions, impurities, and variations in diffusion density. When the fuel cells 94 are assembled into a stack 32, the stack 32 will have a required $\lambda_A$ and $\lambda_C$ that will be an average of the required $\lambda_A$ and $\lambda_C$ of the individual fuel cells 94 that comprise the stack 32. The required $\lambda_A$ and $\lambda_C$ for each stack 32 may vary from one stack to the next. Additionally, a required $\lambda_A$ and $\lambda_C$ will vary with an electrically loading placed on the stack 32. A possible required $\lambda_A$ and $\lambda_C$ for a fuel cell 94 and/or stack 32 is $\lambda_A$=1.3 and $\lambda_C$=2.0. $\lambda_A$=1.3 means that for each 1.0 mol of $H_2$ consumed by the stack 32 to produce electricity 1.3 mol of $H_2$ is required to be supplied to the stack 32. Likewise, $\lambda_C$=2.0 means that for each 1.0 mol of $O_2$ consumed by the stack 32 to produce electricity 2.0 mol of $O_2$ are required to be supplied to the stack 32. The excess $H_2$ and $O_2$ supplied to the stack 32 are exhausted from the stack 32 as respective anode and cathode effluents.

Supplying the stack 32 with the correct $\lambda_A$ and $\lambda_C$ is important for a number of reasons, including ensuring efficient electricity production, avoiding exhausting unnecessary amounts of $H_2$ and $O_2$, and avoiding unnecessary parasitic loses, such as excess operation of a compressor supplying the oxidant or excess operation of a fuel processor supplying reformate. To supply the correct $\lambda_A$ and $\lambda_C$ to the stack 32, the amount of $\lambda_A$ and $\lambda_C$ being supplied to the stack 32 needs to be monitored so that as operating conditions of the stack 32 change (such as changes in electrical loading, temperature, and pressure), the $\lambda_A$ and $\lambda_C$ being supplied can be adjusted to maintain efficient operation of the stack 32. Measuring $\lambda_A$ and $\lambda_C$ can be done by monitoring a voltage output of one or more fuel cells 94 in the stack 32. That is, the voltage output of a fuel cell 94 will vary with the amount of $\lambda_A$ and $\lambda_C$ supplied to the fuel cell 94. The variation of the voltage output of the fuel cell 94 can be measured and used to determine the amount of $\lambda_A$ and $\lambda_C$ being supplied to the stack 32, as will be described in more detail below.

To facilitate the use of one or more fuel cells 94 to monitor the $\lambda_A$ and $\lambda_C$ being supplied to the stack 32, a voltage output of individual fuel cells 94 can be monitored. As shown in FIG. 4, a voltage output of individual fuel cells 94 can be monitored by a voltage sensing device 116 (e.g., voltmeter) which is capable of outputting a signal 118. The signal 118 is inputted into a conventional high-speed analog-to-digital converter 120 (i.e., data acquisition unit) which conditions the signal 118 to eliminate noise, and generates digital data stream 122. The output voltages of the monitored fuel cells 94 are preferably sampled on a regular basis (e.g., every 10 to 100 milliseconds) during operation of the fuel cell stack 32. The resulting signal 118 is conditioned by the A/D converter 120, and inputted as data stream 122 into a data processor 124 where it is compared to predetermined reference voltages stored in memory 126 as will be described in more detail below. Operating conditions of the stack 32 (stack operationals) such as electrical loading, reactant feed stream temperatures and pressures (i.e., taken from sensors not shown) are also inputted to the data processor 124 to ensure that the proper reference voltage is selected from the memory 126 for a given voltage output of a monitored fuel cell 94.

The fuel cell(s) 94 that is used as a sensor(s) to monitor the $\lambda_A$ and $\lambda_C$ can be selected based upon sensitivity to changes in $\lambda_A$ and $\lambda_C$. As was stated above, due to variations in the construction and manufacture of the fuel cells 94, each fuel cell 94 may have a different $\lambda_A$ and $\lambda_C$ required to operate efficiently. Additionally, the variations may cause the fuel cells 94 to have differing sensitivities to changes in $\lambda_A$ and/or $\lambda_C$. That is, the change in voltage output of a particular fuel cell 94 in response to a change in $\lambda_A$ and/or $\lambda_C$ may be more pronounced than a change in voltage output in response to the same change in $\lambda_A$ and/or $\lambda_C$ for the general population of fuel cells 94. This otherwise undesirable characteristic of heightened or pronounced sensitivity to changes in $\lambda_A$ and/or $\lambda_C$ can be used to detect changes in $\lambda_A$ and/or $\lambda_C$ for diagnostic and/or operational assessment of the fuel cell system.

Fuel cells 94 with heightened or pronounced sensitivities to changes in $\lambda_A$ and/or $\lambda_C$ can be identified during inspection prior to assembly or testing of an assembled stack 32. After a fuel cell stack 32 is assembled, the stack 32 is thoroughly tested by placing the stack 32 in a test device, such as a test stand. In the test stand, an electrical connection is made to each fuel cell 94 so that a voltage output of each fuel cell 94 can be monitored while the stack 32 produces electricity under precisely controlled operating conditions. The operating conditions of the stack 32 are accurately measured, controlled, and/or varied during the testing. In a first test run '$T_1$', accurately controlled reactant feed streams 82 and 86 are supplied to the stack 32 so that $\lambda_A$ and $\lambda_C$ are known. The operating conditions of the stack 32, such as electrical load, temperature, pressure, coolant flow, and relative humidity of the various feed streams are also measured and controlled (preferably at nominal conditions). The voltage output of each of the fuel cells 94 is then recorded.

The variable for which heightened sensitivity is desired to be found (the monitored variable) is then adjusted, for a second test run '$T_2$' while keeping the remaining variables constant. The change in voltage output of each of the fuel cells 94 during $T_2$ is recorded. For example, if it is desired to find a fuel cell 94 that has a heightened sensitivity to changes in $\lambda_A$, the fuel feed stream 86 is changed in a controlled and known manner, such as decreasing the amount of hydrogen supplied to the stack 32, and the voltage output of the fuel cells 94 are recorded. The change in the voltage output of each of the fuel cells 94 is calculated and fuel cells having a change in voltage output greater than an average change in voltage output of the general population of fuel cells are identified as candidates having a heightened sensitivity to changes in $\lambda_A$. A voltage change of about 20 mV from average is sufficient for heightened sensitivity. One or more fuel cells 94 are selected from the identified candidates to be used as a sensor fuel cell 94 in stack 32 to monitor changes in $\lambda_A$ in the fuel feed stream 86 based on the results of $T_2$. If a satisfactory sensor fuel cell 94 is not identified in $T_2$, further testing can be done to identify a satisfactory sensor fuel cell 94.

In a third test run, '$T_3$,' $\lambda_A$ is changed again while the remaining variables are held constant and the change in output voltage of each of the fuel cells 94 identified as candidates having heightened sensitivity is determined. Optionally, the change in output voltage for all of the fuel cells 94 can be monitored because each fuel cell 94 is connected to the test stand. The change in output voltage of each of the monitored fuel cells 94 is recorded to generate the data points for the data table of reference voltages and associated operating conditions.

In performing tests $T_1$ through $T_n$, the change in any one variable will be through a finite range. For example, $\lambda_A$ may be changed from 1.5 to 1.0 in various incremental steps, such as 0.1, and output voltages of the fuel cells 94 recorded and compared. Once the tested (monitored) variable has been stepped through the finite range, a different variable, such as electrical loading on the stack 32, is changed to a new value and the tested (monitored) variable is again stepped through its incremental changes while the remaining variables (including the changed 'different variable') are held constant. This process is continued until one or more fuel cells 94 having a desired heightened sensitivity sufficient to act as a sensor have been identified and until a sufficient amount of empirical data has been established for various operating conditions of the stack 32 so that a voltage output of the fuel cell sensor can be used to measure the tested (monitored) variable. For example, the process can be continued until 3 to 5 different operating conditions of the stack have been tested and 2 to 5 data points for each tested operating condition are gathered.

This iterative testing procedure can be continued to identify fuel cells 94 that have heightened sensitivities to changes in other variables (in the operating conditions) of the stack 32. For example, fuel cells 94 can exhibit heightened sensitivities to changes in $\lambda_A$, $\lambda_C$, lambda of $CO_2$, lambda of CO and relative humidity in feed streams. It should be understood that a rate of change of output voltage could be used in addition to or in place of the use of the output voltage.

The gathered and recorded empirical data for each of the fuel cells 94 that are used as a sensor in the stack 32 are stored in the memory 126 as a data table for reference by the data processor 124, and is available for comparison to the measured voltage output of the sensor fuel cells 94. Further, modeling of the system using the empirical data may also be conducted to provide a more populated data table. The stored data provides lambda valves for the reference voltages of the sensor fuel cell 94 for the operating conditions of the stack 32. A lookup function is used to compare the voltage output of the sensor fuel cells 94 with the reference voltages in the data table in the memory 126 to provide a lambda valve for the given operating state until a reference voltage closest to the measured voltage of the sensor fuel cell 94 for the operating condition of the stack 32 is identified. If an exact match is made between a reference voltage and a measured voltage output, the value of the variable being measured, such as $\lambda_A$ and $\lambda_C$, is determined from the empirical data associated with the matching data. A perfect match between the measured voltage output and the reference voltage outputs stored in the memory 126 is not necessary. Rather, linear interpolation can be used to establish an estimated value for the variable being measured when the measured voltage output lies between reference voltage data points stored in the memory 126. Linear interpolation can be used even when the change in voltage output of the sensor fuel cell 94 does not vary linearly with changes in the variable the sensor monitors. To increase the accuracy of the linear interpolation, the incremental step changes through which the tested variable is stepped during testing and empirical data collecting can be reduced so that the response more closely approximates a linear response. While linear interpolation has been described, it should be understood that higher order interpolation may be used to relate a given fuel cell voltage to the associated lambda value.

The tables generated for the various operating conditions and voltage outputs of the fuel cells 94 will vary in size depending upon the number of variables recorded, the size of the incremental steps through which the monitored variable to be ascertained by the sensor was changed and the number of different operating conditions of the stack 32 that were stepped through. The storage of such a large amount of data increases the amount of storage capacity required by the memory 126 and the computations performed by processor 124. To avoid the need for excessive storage capacity, the empirical data can be used to create an equation that approximates the value of the monitored variable as a function of a voltage output of the sensor fuel cell 94, and various operating conditions of the stack 32. Such equations can be curve fit, surface fit, or described by system characterization to approximate the empirical data. System characterization is a mathematical method known in the field. It takes a multi-input, single-output system, and, using empirical data, forms an equation to approximate the system output given any input values. The data processor 124 will then use the applicable equation to determine a value of the monitored variable based on the voltage output of the sensor fuel cell 94 and the operating conditions of the stack 32.

Instead of testing each fuel cell 94 in the stack 32 to identify fuel cells 94 that have a voltage output with a heightened sensitivity to changes in specific variables, it is possible to manufacture fuel cells 94 with a heightened sensitivity. These specialized fuel cells 94 can be manufactured to have a heightened sensitivity to a given variable. For example, to manufacture a fuel cell 94 having a heightened sensitivity to changes in $\lambda_A$, the anode flow channel 102 can be made more restrictive and thereby restrict the amount of hydrogen flowing by the anode face 96*a*. The reduced flow of hydrogen by the anode face 96*a* causes the fuel cell 94 to have a heightened sensitivity to changes in $\lambda_A$. Alternatively, and/or additionally, the diffusion media, or primary current collectors 76 and 80, could be made to be more restrictive, and thereby restrict the amount of hydrogen flowing by the anode face 96*a*. The reduced flow of hydrogen by the anode face 96*a* causes the fuel cell 94 to have a heightened sensitivity to changes in $\lambda_A$.

To produce a fuel cell 94 having a heightened sensitivity to changes in $\lambda_C$, the cathode flow channel 100 can be made more restrictive and thereby restrict the amount of oxygen flowing by the cathode face 96*c*. The reduced flow of oxygen by the cathode face 96*c* causes the fuel cell 94 to have a heightened sensitivity to changes in $\lambda_C$. Alternatively, and/or additionally, the diffusion media, or primary current collectors 74 and 78, could be made to be more restrictive, and thereby restrict the amount of oxygen flowing by the cathode face 96*c*. The reduced flow of oxygen by the cathode face 96*c* causes the fuel cell 94 to have a heightened sensitivity to changes in $\lambda_C$.

To make a fuel cell 94 that has a heightened sensitivity to high relative humidity (RH), teflon loading could be varied to make the fuel cell 94 more susceptible to flooding. The fuel cell 94 will then flood before the other fuel cells in the stack and the voltage output of the fuel cell 94 will change in response to the flooding. Alternatively, and/or additionally, a fuel cell 94 adjacent an end plate of the stack 32 can be made to have a heightened sensitivity to flooding by removing some of the insulation around the end plate and thereby reducing the temperature of the fuel cell 94. The reduced temperature will promote condensation and flooding in the fuel cell 94 prior to condensation and flooding in other fuel cells in the stack. Alternatively, and/or additionally, a fuel cell 94 could have above average size of coolant passages to force the fuel cell 94 temperature closer to the coolant inlet temperature instead of coolant outlet temperature. The reduced temperature will promote condensation and flooding in the fuel cell 94 prior to condensation and flooding in other fuel cells in the stack.

When specialized fuel cells 94 are used as sensors in the stack 32, the memory 126 can be provided with tabulated empirical data gathered by testing the specialized fuel cell 94 on the test stand in the manner discussed above. However, when using specialized fuel cells 94, the tasks of identifying cells having a heightened sensitivity is not required. The empirical data can also be used to form an equation that approximates the value of the variable being monitored by the specialized fuel cell 94 as a function of the voltage output of the specialized fuel cell 94 and the operating condition of the stack 32. Alternatively, if the specialized fuel cells are manufactured to have approximately the same heightened sensitivity, a model can be created that predicts the behavior of the specialized fuel cell 94 and used to predict the value of the monitored variable.

Through early detection of changes in $\lambda_A$ and/or $\lambda_C$, remedial measures, such as increasing or decreasing the fuel and/or oxygen being supplied to the stack 32, can be taken to minimize and/or avoid impacting the operation of the stack 32. Additionally, by being able to detect changes in $\lambda_A$ and/or $\lambda_C$ open loop and closed loop control can be implemented. For example, a feed forward controller is a model that predicts the likely fuel processor inputs to achieve the desired $\lambda_A$. Although the feed forward controller may closely predict the fuel processor inputs, it may not be perfectly accurate due to fuel processor manufacturing variability or catalyst degradation over time. A closed loop controller could then adjust the fuel processor inputs, (called trimming the feed forward result) to correct small $\lambda_A$ error remaining. The closed loop controller adjusts the inputs until the output is the exact desired $\lambda_A$. The feedback for the closed loop controller is the measured $\lambda_A$ based on the fuel cell 94 voltage level. This same approach could be applied to $\lambda_C$ as well.

The ability to detect changes in $\lambda_A$ and/or $\lambda_C$ reduces system cost by allowing selective diagnostics. For example, if the close loop adjustment strays too far from the predicted setting, a warning can be issued identifying a problem early. If the lambdas required to make the stack run gradually rise over time, a warning can be issued at some predetermined lambdas that the catalyst needs replacement. If $\lambda_A$ suddenly rises because of a fuel delivery problem, the controller can take action to protect components downstream of the stack. For example, if the sensitive fuel cell 94 indicates a rise in $\lambda_A$, then the controller can send more air to the downstream combustor. Assuming a lean burning combustor, the extra air cools the combustor so the additional fuel does not cause an over-temperature.

Additionally, by being able to detect changes in $\lambda_A$ and/or $\lambda_C$ stack to stack variability can be compensated for. To run the system efficiently, $\lambda_A$ and $\lambda_C$ should be minimized. Another type of control is a closed loop controller that drops commanded $\lambda_A$ and $\lambda_C$ until the voltage output of the appropriate highly sensitive fuel cells 94 begin to fall. This determines the stack's minimum $\lambda_A$ and $\lambda_C$. Each stack may have a slightly different minimum allowable $\lambda_A$ and $\lambda_C$ because of stack-to-stack variability. The closed loop control finds each stack's specific minimum lambda operation point and runs the stack at that point.

The use of one or more fuel cells 94 to monitor changes in $\lambda_A$ and/or $\lambda_C$ eliminates the necessity of monitoring the voltage output of each fuel cell 94 in the stack 32. Because changes in $\lambda_A$ and/or $\lambda_C$ are known, the performance of the stack can be optimized without monitoring every fuel cell 94. The reduced instrumentation lowers the cost and complexity of the stack 32 and increases reliability by reducing the number of electrical connections and wires.

It should be understood that the stack 32 according to the principles of the present invention can utilize more than one fuel cell 94 as a sensor for a specific variable. For example, the stack can use two fuel cells 94 having a heightened sensitivity to the same variable thus providing redundancy in the monitoring of the variable. Additionally, it should be understood that a cluster of fuel cells 94 can be used to monitor a specific variable. A cluster of fuel cells 94 is a grouping of fuel cells 94 whose cluster voltage is used to monitor a particular variable. For example, the combined voltage output of five fuel cells 94 can be tested for heightened sensitivity to changes in a particular variable. If the cluster is found to have heightened sensitivity, the cluster can be used to monitor changes in the particular variable in the same manner as an individual fuel cell can be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell assembly receiving reactant flows and generating an electric current therefrom, the fuel cell assembly comprising:

a plurality of fuel cells arranged in a stacked configuration with said plurality of fuel cells electrically in series, a first fuel cell of said plurality of fuel cells having a voltage output that changes in a known manner in response to changes in lambda of a first reactant flow;

a voltage monitoring device monitoring said voltage output of said first fuel cell; and a controller that receives a signal from said voltage monitoring device corresponding to said voltage output of said first fuel cell, said controller controlling said first reactant flow in response to said signal.

2. The fuel cell assembly of claim 1, wherein said controller includes a microprocessor that compares said voltage output of said first fuel cell to a library of stored voltage outputs and adjusts said first reactant flow in response to said comparison.

3. The fuel cell assembly of claim 2, wherein said library is a compilation of expected voltage outputs for various operating conditions of said fuel cell stack and lambdas of said first reactant flow.

4. The fuel cell assembly of claim 1, further comprising a second fuel cell of said plurality of fuel cells having a second voltage output that changes in a known manner in response to changes in a lambda of a second reactant flow, said voltage monitoring device monitoring said second voltage output of said second fuel cell.

5. The fuel cell assembly of claim 4, wherein said first reactant flow is a fuel flow and said second reactant flow is an oxidant flow.

6. The fuel cell assembly of claim 1, wherein said first reactant flow is a fuel flow.

7. The fuel cell assembly of claim 1, wherein said first reactant flow is an oxidant flow.

8. The fuel cell assembly of claim 1, wherein said first fuel cell is a cluster of fuel cells having a voltage output that changes in a known manner in response to a change in lambda of said first reactant flow and said voltage monitoring device monitors said voltage output of said cluster of fuel cells.

9. The fuel cell assembly of claim 1, wherein said first fuel cell is a plurality of fuel cells that each have a voltage output that changes in a known manner in response to a change in a lambda of said first reactant flow, and said voltage monitoring device monitors said voltage output of each of said plurality of fuel cells having said voltage output that changes in said known manner.

10. The fuel cell assembly of claim 1, wherein said first fuel cell is fabricated to have a voltage output that changes in a known manner in response to changes to said lambda of said first reactant flow.

11. The fuel cell assembly of claim 10, wherein said first fuel cell is fabricated with a first reactant flow channel that is more restrictive than first reactant flow channels of said plurality of fuel cells so that said voltage output of said first fuel cell is more sensitive to changes in lambda of said first reactant flow than voltage outputs of said plurality of fuel cells.

12. The fuel cell assembly of claim 10, wherein said first fuel cell is fabricated with a first reactant diffusion media that is more restrictive than first reactant diffusion medias of said plurality of fuel cells so that said voltage output of said first fuel cell is more sensitive to changes in lambda of said first reactant flow than voltage outputs of said plurality of fuel cells.

13. The fuel cell assembly of claim 10, wherein said first fuel cell is fabricated with a first reactant primary current collector that is more restrictive than first reactant primary current collectors of said plurality of fuel cells so that said voltage output of said first fuel cell is more sensitive to changes in lambda of said first reactant flow than voltage outputs of said plurality of fuel cells.

14. The fuel cell assembly of claim 10, wherein said first fuel cell is fabricated with coolant passageways that are larger than coolant passageways of said plurality of fuel cells so that said voltage output of said first fuel cell is more sensitive to flooding of said stack than voltage outputs of said plurality of fuel cells.

15. The fuel cell assembly of claim 1, wherein said first fuel cell is selected from said plurality of fuel cells based on testing each fuel cell of said plurality of fuel cells for voltage output that changes in a predetermined manner in response to changes in said lambda of said first reactant flow.

16. A method of monitoring changes in a lambda of a reactant feed stream to a fuel cell stack comprised of a plurality of fuel cells arranged electrically in series, the method comprising the steps of:

supplying a first reactant feed stream to a fuel cell stack;

supplying a second reactant feed stream to said fuel cell stack;

selecting a first fuel cell in said fuel cell stack having a voltage output that varies in a known manner to a change in lambda of said first reactant feed stream;

monitoring said voltage output of said first fuel cell; and controlling said first reactant feed stream based on said voltage output of said first fuel cell.

17. The method of claim 16, wherein said step of monitoring includes comparing said voltage output of said first fuel cell to a library of stored voltage outputs, and said step of controlling includes adjusting said first reactant stream based on said comparison.

18. The method of claim 17, wherein said library is a compilation of expected voltage outputs for various operating conditions of said fuel cell stack and changes in said lambda of said first reactant stream.

19. The method of claim 18, wherein said compilation of expected voltage outputs is based on modeling said first fuel cell.

20. The method of claim 18, wherein said compilation of expected voltage outputs is based on testing said first fuel cell.

21. The method of claim 16, further comprising the steps of:
   selecting a second fuel cell in said fuel cell stack having a voltage output that varies in a known manner to changes in a lambda of said second reactant feed stream;
   monitoring said voltage output of said second fuel cell; and
   controlling said second reactant feed stream based on said voltage output of said second fuel cell.

22. The method of claim 21, wherein said first reactant feed stream is a fuel feed stream and said second reactant feed stream is an oxidant feed stream.

23. The method of claim 16, further comprising the steps of:
   selecting a second fuel cell in said fuel cell stack having a voltage output that varies in a known manner to changes in said lambda of said first feed stream;
   monitoring said voltage output of said second fuel cell; and
   controlling said first reactant feed stream based on at least one of said voltage outputs of said first and second fuel cells.

24. The method of claim 16, further comprising the steps of:
   selecting a cluster of fuel cells having a voltage output that varies in a known manner to changes in a lambda of said first reactant feed stream;
   monitoring said voltage output of said cluster of fuel cells; and
   controlling said first reactant feed stream based on said voltage output of said cluster of fuel cells.

25. The method of claim 16, wherein said first reactant feed stream is a fuel feed stream.

26. The method of claim 16, wherein said first reactant feed stream is an oxidant feed stream.

27. The method of claim 16, wherein said step of selecting said first fuel cell includes testing each fuel cell of the plurality of fuel cells that comprise the fuel cell stack to determine a voltage output variance for each cell in response to variances in said lambda of said first reactant stream and selecting said first fuel cell based on said testing.

28. The method of claim 16, wherein said step of selecting said first fuel cell includes fabricating said first fuel cell to have a voltage output that varies in a known manner to changes in said lambda of said first reactant flow.

29. A method of making a sensor to monitor a lambda of a reactant feed stream to a fuel cell stack comprising the steps of:
   (a) supplying first and second reactant feed streams to a fuel cell;
   (b) generating a voltage output with said fuel cell from said first and second reactant feed streams;
   (c) monitoring said voltage output of said fuel cell;
   (d) varying a lambda of said first reactant feed stream;
   (e) determining a sensitivity of said fuel cell to variation of said lambda of said first reactant feed stream; and
   (f) selecting said fuel cell as a sensor fuel cell when said fuel cell has a desired sensitivity characteristic to said lambda of said first reactant feed stream.

30. The method of claim 29, wherein said step of determining a sensitivity includes calculating a change in said voltage output of said fuel cell in response to variation of said lambda of said first reactant feed stream.

31. The method of claim 30, wherein said step of selecting includes comparing said change in said voltage output of said fuel cell to an average change in voltage output of other fuel cells in response to a same variation of said lambda of said first reactant feed stream.

32. The method of claim 31, further comprising the step of:
   collecting empirical data on said sensitivity of said fuel cell by repeatedly performing steps (d) and (e).

33. The method of claim 32, further comprising the step of:
   changing an operating condition of said fuel cell then repeatedly performing steps (e) and (f) to collect empirical data on said sensitivity of said fuel cell for said operating condition of said fuel cell.

34. The method of claim 32, further comprising the step of:
   generating a library of reference voltages from said empirical data to use with said first fuel cell to monitor said lambda of said first reactant feed stream.

35. The method of claim 32, further comprising the step of:
   generating an equation from said empirical data that models said voltage output of said fuel cell as a function of said lambda.

36. The method of claim 29, further comprising the steps of:
   supplying said first and second reactant feed streams to a cluster of fuel cells;
   generating a voltage output with said cluster of fuel cells from said first and second reactant feed streams;
   monitoring said voltage output of said cluster of fuel cells;
   varying said lambda of said first reactant feed stream;
   determining a sensitivity of said cluster of fuel cells to variation of said lambda of said first reactant feed stream; and
   selecting said cluster of fuel cells as a sensor cluster of fuel cells when said cluster of fuel cells has a desired sensitivity characteristic to said lambda of said first reactant feed stream.

37. The method of claim 29, further comprising the steps of:
   supplying said first and second reactant feed streams to a fuel cell stack comprised of a plurality of fuel cells arranged electrically in series;
   generating a voltage output with each fuel cell of said stack from said first and second reactant feed streams;
   monitoring said voltage output of each fuel cell of said stack;
   varying said lambda of said first reactant feed stream;
   determining a sensitivity of each fuel cell of said stack to variation of said lambda of said first reactant feed stream; and
   selecting a sensor fuel cell having a desired sensitivity characteristic to said lambda of said first reactant feed stream in said fuel cell stack.

38. The method of claim 29, wherein said first reactant feed stream is a fuel feed stream.

39. The method of claim 29, wherein said first reactant feed stream is an oxidant feed stream.

* * * * *